Aug. 11, 1936.　　　B. F. W. HEYER　　　2,050,321
BATTERY TERMINAL CONNECTER
Filed July 11, 1931　　　2 Sheets-Sheet 1
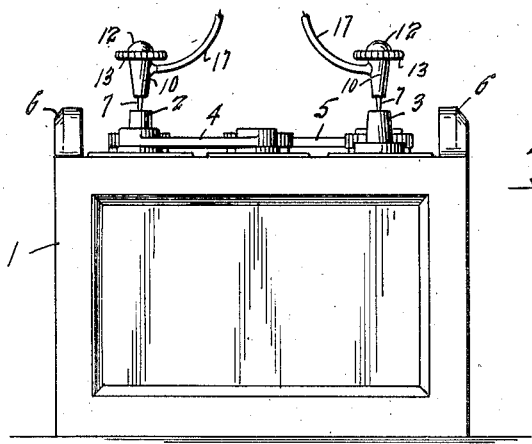
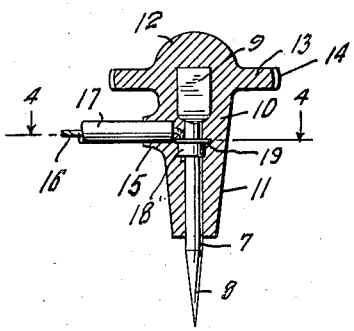
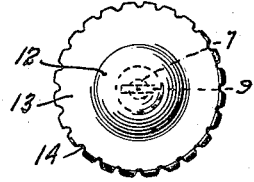
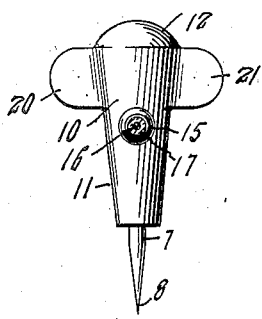
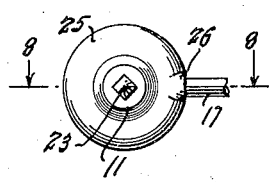
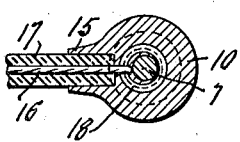
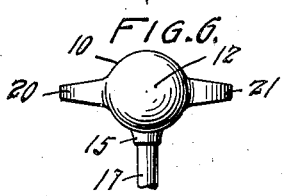
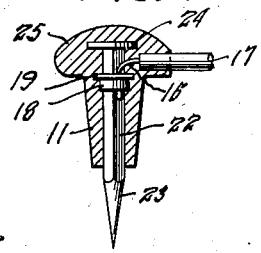
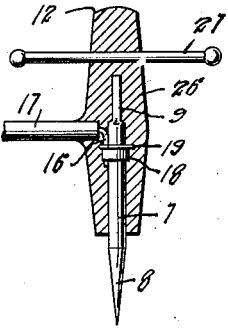
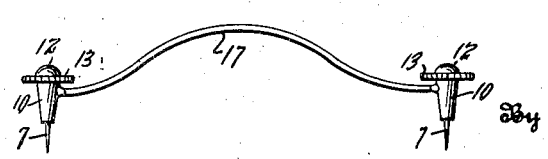
Inventor
BENJAMIN F. W. HEYER
By Semmes & Semmes
Attorneys Aug. 11, 1936.   B. F. W. HEYER   2,050,321
BATTERY TERMINAL CONNECTER
Filed July 11, 1931   2 Sheets-Sheet 2

Inventor
BENJAMIN F. W. HEYER
By Semmes & Semmes
Attorneys

Patented Aug. 11, 1936

2,050,321

UNITED STATES PATENT OFFICE 2,050,321

BATTERY TERMINAL CONNECTER

Benjamin F. W. Heyer, Bloomfield, N. J.

Application July 11, 1931, Serial No. 550,208

3 Claims. (Cl. 173—259)

This invention relates in general to connecting devices, and more particularly has reference to a terminal connecter for storage batteries.

Various types of clamps have generally been employed for connecting conductors to storage battery terminals. These devices are costly and, further, have proved inefficient in use by reason of certain structural limitations therein.

The resilient elements included in the construction of clamps tend to wear or break so as to cause such devices to become inoperative. Also, clamps, because of the extensive and uneven surface area thereof, corrode rapidly in proximity to battery acid fumes and tend to become unfit for use in a short time.

Foremost among the disadvantages attending the use of clamps, however, is the fact that unknowingly a poor connection may easily be inadvertently established. This is usually caused by a coating of material which commonly forms on a battery terminal or clamp, or both, partially or wholly insulating the clamp from the terminal.

The disadvantages attending the use of clamps have largely been eliminated in the provision of connecters including a pointed member adapted to be driven or otherwise forced into a battery terminal. The construction of devices of this character is simple and hence these types of connecters are cheap to produce. The pointed member is capable of penetrating any coating on a battery terminal to insure a good connection and there are no movable parts to wear or become damaged. Further, such connecters are not subject to corrosion to the same extent as clamps, as the surface area thereof is comparatively small and even, and may be efficiently coated with any suitable corrosion resisting material.

It has been found in practice that connections of this type, including a pointed member for being forced into the terminal of a storage battery, should be constructed so that the pointed member will not rotate, and so that the connection between the conductor and the pointed member will not be exposed to the corrosive action of battery fumes. Also, that it is desirable to provide a head of soft metal or other material, to cushion pounding shocks, and to form the connecter so that it may be easily manipulated for connection in, and disconnection from a battery terminal.

An object of this invention is to provide a connecter for a battery terminal with a pointed head for fitting in the terminal, having the upper end flattened to fix the pointed member against rotation in a tapered body portion formed with an oval pounding head, a circular disk having a serrated grasping rim, and an apertured boss for admitting an insulated conductor for connection to the pointed member.

Another object of this invention is to provide a connecter for a battery terminal with a pointed member for fitting in the terminal, having the upper end flattened to fix the member against rotation in a tapered body portion formed with an oval pounding head, grasping ears, and an apertured boss for admitting an insulated conductor for connection to the pointed member.

Still another object of this invention is to provide a connecter for a battery terminal with a pointed member for fitting in the terminal, square in cross section, and provided with a head at the top end thereof, for fixing against rotation and vertical movement in a tapered body portion formed with a mushroom pounding head, and an apertured boss for admitting an insulated conductor for connection to the pointed member.

Still another object of this invention is to provide a connecter for a battery terminal with a pointed member for fitting in the terminal, having the upper end flattened for fixing against rotation in a tapered body portion having an aligned oppositely tapered pounding head with a transverse aperture for receiving a centrally positioned grasping cross bar and an apertured boss for admitting an insulated conductor for connection to the pointed member.

Still another object of this invention is to provide a connecter for a battery terminal with a pointed member for fitting in the terminal, having a grasping cross bar formed on its top end, for fixing in a tapered body portion having an aligned oppositely tapered pounding head, and an apertured boss for admitting an insulated conductor for connection to the pointed member.

Still another object of this invention is to provide a connecter for a battery terminal with a pointed member for fitting in the terminal, having a lateral grasping flange for fixing against rotation in a tapered body portion, having an aligned oppositely tapered pounding head, and an apertured boss for admitting an insulated conductor for connection to the pointed member.

Still another object of this invention is to provide a connecter for a battery terminal with a pointed member for fitting in the terminal, having a turned over lateral flange at its upper end for fixing against rotation in a tapered body portion, having an aligned oppositely tapered pounding head, and an insulator grasping sleeve telescoped over the end of the lateral flange and fixed at one end against the periphery of the body portion, for admitting an insulated conductor at the other end for connection to the lateral flange.

Another object of this invention is to provide a connecter for a battery terminal with a pointed member for fitting in the terminal having a flattened end for fixing against rotation in a tapered body portion, having an aligned oppositely tapered pounding head and a grasping handle and sleeve screwed in aligned tapered apertures formed in the periphery of the body portion, the sleeve being adapted to admit an insulating conductor for connection to the pointed member through a helical spring and contact member fitted therein.

Another object of this invention is to provide a connecter for a battery terminal with a pointed member for fitting in the terminal, having a flattened end for fixing against rotation in a tapered body portion, having an aligned oppositely tapered pounding head, and an aperture for admitting an insulator grasping cross bar, the cross bar projecting from one side of the body portion being formed as a sleeve for admitting an insulated conductor, for connection to the pointed member.

Still another object of this invention is to provide a connecter for a battery terminal with a pointed member for fitting in the terminal, having a cubical top for fixing against rotation in a tapered body portion, having an aligned oppositely extending pounding head, and a grasping sleeve fitted in a tapered aperture in the body portion in alignment with the cubical top on the pointed member for receiving an insulated conductor for connection to the pointed member through a member screwed in the sleeve and cubical head.

Still another object of this invention is to provide a connecter for a battery terminal with a pointed member for fitting in the terminal, having a flattened end for fixing against rotation in a tapered body portion, having an aligned oppositely tapered pounding head, a grasping cross bar fitted therein, and an aperture in the pounding head for admitting an insulated conductor for connection to the pointed member by a spiral contact spring formed of the end of the conductor.

Still another object of this invention is to provide a connecter for a battery terminal, having a pointed member integrally formed with a body portion provided with a pounding head and an insulator grasping sleeve connected to the body portion for receiving an insulated conductor adapted to extend into the body portion.

Still another object of this invention is to provide a connecter for a storage battery terminal having a pointed member for fitting in the terminal integrally formed with a body portion having a soft metal pounding head fitted therein, and a grasping sleeve connected to the body portion for receiving an insulated conductor adapted to extend into the body portion.

A further object of this invention is to provide a connecter for battery terminals composed of material resistant to corrosion by battery acid fumes.

A still further object of this invention is to provide connecters for battery terminals adapted to impress indicia on the terminals representative of the charge thereof.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown, in the accompanying drawings, means for carrying the same into practical effect, without limiting the improvements in their useful applications, to the particular constructions which, for the purpose of explanation, have been made the subject of illustration.

In the drawings forming a part of this specification:

Figure 1 is a side elevational view of a conventional three cell storage battery shown with a form of my novel connecter fitted in the terminal thereof;

Figure 2 is a sectional view of the form of connecter shown in Figure 1;

Figure 3 is a top view of the form of connecter shown in Figure 1;

Figure 4 is a sectional view taken on line 4—4 of Figure 2;

Figure 5 is a side elevational view of a modified form of connecter;

Figure 6 is a top view of the connecter shown in Figure 5;

Figure 7 is a top view of another modified form of connecter;

Figure 8 is a sectional view taken on line 8—8 of Figure 7;

Figure 9 is a sectional view of still another modified form of connecter;

Figure 22 is a front view of two connecters joined by a conductor.

Figure 10:
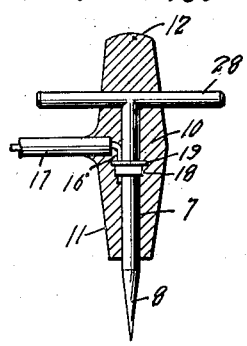
Figure 10 is a sectional view of still another modified form of connecter.

Referring more particularly by numerals to the drawings, and more especially to Figure 1, there is shown a conventional three cell storage battery having a casing 1, end cell terminals 2 and 3, and cell connecters 4 and 5. The casing 1 is shown provided with handles 6.

In accordance with my invention, I contemplate as connecters for the terminals 2 and 3, as a substitute for clamps and the pointed devices previously used, any of the novel constructions shown in detail in Figures 2 through 19.

In Figure 2 is shown a connecter comprising a member 7 round in cross section and pointed at the lower end, as at 8. The top of the member 7 is flattened, as at 9, and is adapted to be encased in a body portion 10, downwardly tapered, as at 11, and formed with an oval head 12 on the top. A circular disk 13, provided with a serrated rim 14, is formed on the body portion below the head 12. An apertured boss 15 is formed on the periphery of the body portion below the disk 13 for admitting a conductor 16, surrounded by insulation 17. The end of the conductor is adapted to be suitably connected to the member 7. This may be accomplished by fitting the end of the conductor through a collar 18 having a rim 19, fitted over the member 7.

In the construction of the connecter, the end of the conductor is adapted to be fitted against the member 7 by insertion through the collar 18, and the body portion including the disk 13, pounding head 12 and boss 15, cast therearound. The pointed member 7 is preferably composed of any suitable hard metal, such as steel, while the body portion is composed of a soft metal of the character of lead. As previously stated, the point 8 on the member 7 is adapted to be inserted in the terminal of a storage battery. This may be easily done by pounding with any suitable tool, such as a hammer, on the head 12.

The connecter is adapted to be withdrawn from a battery terminal by grasping the disk 13 about the serrated rim 14 and pulling the point out of the terminal. It may be found that the point 8 can be inserted in the battery terminal by pushing on the disk 13, without pounding the head 12 with a tool. If the connecter cannot be readily withdrawn, it may be tapped with a hammer around the serrated rim 14, to loosen the connection.

In a connecter of this character, as previously stated, it is desirable to form the point 8 of hard metal and the pounding head 12 on the body portion of a soft metal. Unless the point 8 is composed of a hard metal, it will soon wear, and difficulty will be experienced in driving the same to a sufficient depth in a battery terminal to establish a satisfactory connection. If the head 12 is formed of a hard metal, it is necessary to use a soft metal pounding tool for the reason that otherwise, the shock of contact of two hard metals will make grasping of the point in the battery terminal difficult.

It is also desirable, as has already been mentioned, to secure a tight fit between the conductor and the member 7, so that the connection will not be exposed to the corrosive action of battery acid fumes. By casting the end of the conductor in metal, the connection is effectively sealed against such corrosion. Flattening of the top of the pointed member 7, as at 9, prevents turning of the member relative to the body portion, and eliminates the disadvantages which would obtain by such movement, insuring a firm seating of the point in a battery terminal. A tight connection is similarly desirable at the point where the conductor 17 enters the body portion. In the provision of the boss 15, a tight fit around the insulation to prevent the ingress of battery acid fumes is insured.

The body portion is preferably composed of a soft metal of a character resistant to battery acid fumes, such as lead. In the use of a hard metal for the pointed member 7, it is desirable to coat the same with a metal, such as lead, so as to similarly render the point resistant to corrosion.

It will be apparent from the foregoing description that my connecter is susceptible of a wide variation in construction. For example, in Figure 5, there is shown a connecter having oppositely positioned grasping ears 20 and 21 substituted for the grasping disk 13 having the serrated rim 14. These ears are adapted to provide for grasping the connecter for the insertion and withdrawal of the same from a battery terminal in the same manner as the disk 13.

In Figures 7 and 8 is shown a form of connecter having a terminal engaging member 22, square in cross section, and formed with a point 23 substituted for the member 7 shown in Figure 2. The member 22 is further provided with a head 24 at the top and is adapted to be encased in a cast body portion, tapered at the bottom, as at 11, in the same manner as the body portion shown in Figure 2. The disk 13 and boss 15 are dispensed with and a mushroom head 25 substituted therefor adapted to serve in combination the same purpose as the head 12 and disk 13 on the body portion shown in Figure 2. The turning of the member 22 relative to the body portion is insured against by reason of the square configuration of the same. Similarly, relative longitudinal movement between the member and body portion is prevented by the head 24. The square configuration of the member 22 in cross section and the head 24 are thus adapted to serve the same purpose as the flattened head 9 on the member 7 shown in Figure 2.

The conductor 16 is fixed on the member 22 by a collar 18 having a rim 19, in the same manner as the collar shown in Figure 2. It will be appreciated in this connection that the rim 19 on the collar, like the construction shown in Figure 2, prevents movement of the collar and insures a stationary connection, inasmuch as the body portion is cast therearound. The conductor 16 and insulation 17 are adapted to be fitted through an apertured boss 26 provided in the side of the mushroom head, the boss 26 being substantially the same as the boss 15 described in Figure 2, except that it is formed on the periphery of the head 25, in place of on the tapered body portion.

In Figure 9 is shown another form of connecter similar to that shown in Figure 2, except the head 12 and disk 13 are dispensed with and an aligned oppositely tapered pounding head 26, integrally formed on the top of the body portion substituted therefor. In this construction, a cross bar 27 is extended through a transverse aperture provided in the pounding head for grasping the connecter, the cross bar being provided for the same purpose as the grasping disk 13 integrally formed on the body portion, shown in Figures 1 to 3. The insulated conductor is introduced intermediate the pounding head and tapered portion, through an apertured boss and connected to the pointed member in the same manner as has previously been described with reference to the other forms.

In Figure 10 is shown a construction similar to that shown in Figure 9, except for the separate grasping cross bar 27, there is substituted a cross bar 28 integrally formed with the pointed member 7.

Figure 11:
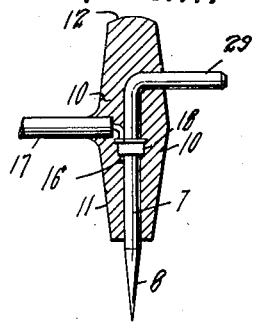
Figure 11 is a sectional view of still another modified form of connecter.

Similarly in Figure 11 there is shown a construction otherwise the same as that shown in Figure 10, except one of the arms of the cross bar 28, integrally formed with the pointed member 7, is omitted to provide a single laterally extending grasping flange 29. It will be appreciated that the members 27, 28, and 29, shown in Figures 9, 10, and 11, are adapted to act as grasping means for manipulating the connecter in the same manner as the rim 14 or ears 20 and 21 described in Figures 1–3 and 5, respectively.

Figure 12:
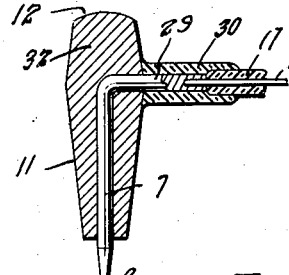
Figure 12 is a sectional view of still another modified form of connecter.

In Figure 12 is shown a connecter constructed in a manner somewhat similar to that shown in Figure 11, except that the boss for admitting the conductor is dispensed with and an insulator sleeve 30 is fitted over the end of the arm 29. The conductor 16 and insulation 17 are adapted to be inserted in the open end of the sleeve 30 and the conductor connected to the end of arm 29. The body portion 11 is provided with an aligned upwardly tapered pounding head 32, shorter than that shown in Figures 9 and 11, however.

Figure 13:
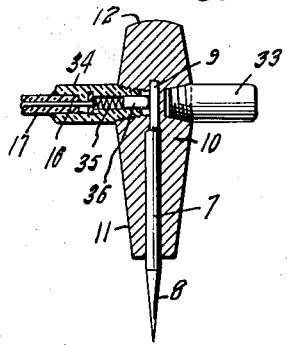
Figure 13 is a sectional view of still another modified form of connecter.
Figure 14:
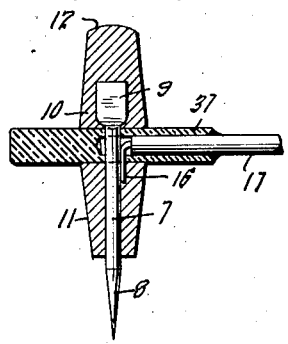
Figure 14 is a sectional view of still another modified form of connecter.

In Figure 13 there is shown a connecter having a body portion like that shown in Figure 12, and a pointed member like those shown in Figures 2 and 9. In this construction, for the purpose of grasping the connecter, however, there is provided a separate arm 33 screw-threaded in a transverse tapered seat provided in the side of the body portion adjacent the flattened end 9 of the pointed member 7. The conductor is connected to the pointed member 7 through a sleeve 34 screwed in the opposite side of the body portion in alignment with the arm 33, in a threaded tapered seat. The connection between the conductor 16 and the pointed member 7 is made through a spring 35 and contact member 36 fitted in the sleeve against the end of the conductor and flattened portion 9 of the pointed member, respectively. It will be appreciated that the spring 35 will act to maintain a permanent contact under tension.

Figure 15:
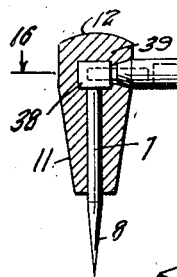
Figure 15 is a sectional view of still another modified form of connecter.
Figure 16:
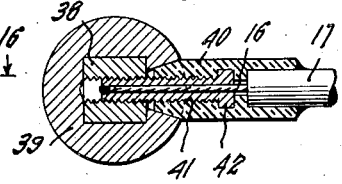
Figure 16 is a sectional view taken on line 16—16 of Figure 15.

In Figure 15 is shown a connecter similar to that shown in Figure 13, in which the flattened end 9 of the pointed member 7 is dispensed with, however, and a cubical head 38 provided with a threaded aperture substituted therefor. Also, the body portion 11 is provided with a shorter pounding head 39 than that shown in Figure 13. For the arm 33 shown in Figure 13, there is substituted a sleeve 40 for admitting the conductor 16, as better shown in Figure 16. The conductor 16 is adapted to extend through an externally threaded sleeve 41 screwed in the aperture in the cubical head 38 on the pointed member 7 and in the sleeve 40. The sleeve 41 is formed with a head 42 to prevent relative rotation thereof with respect to the sleeve 40. The sleeve 34 shown in Figure 13 is dispensed with in this construction.

Figure 17:
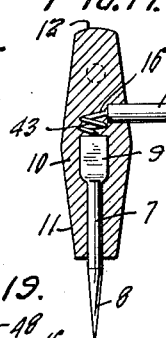
Figure 17 is a sectional view of still another modified form of connecter.

In Figure 17 is shown a connecter construction like that shown in Figure 9, except that the boss for admitting the conductor and insulation is dispensed with, as is the collar 18 for connecting the conductor to the pointed member 7. The conductor is extended through an aperture provided in the side of the body portion, and the end of the conductor formed as a spiral spring 43 contacting at the end with the flattened end 9 on the pointed member 7. In this manner, a contact under tension, corresponding to that shown in Figure 13, is obtained.

Figure 18:
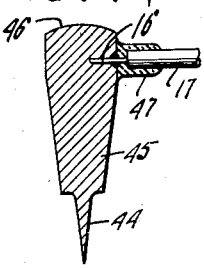
Figure 18 is a sectional view of a still further modified form of connecter.

In Figure 18 is shown an integral form of connecter having a pointed member 44 formed in one piece with a body portion 45 terminating at the top in a pounding head 46. As previously stated, it is desirable, if not necessary, to employ a hard metal to form the point 44 coated with a material resistant to battery acid fumes if the metal is subject to corrosion by the same. Where the body portion and pounding head are integrally formed with the point, it may be found desirable to employ an acid resisting metal such as monel metal in the construction thereof. This same construction may, of course, be employed in the use of other metal, and the connecter coated with suitable material not subject to corrosion by battery acid fumes in the same manner as has already been described with reference to the pointed member.

A sleeve 47 is fixed on the side of the body portion for admitting the conductor, which is adapted to be embedded in the body portion to make a firm connection. The sleeve 47 as well as a conduit for the conductor serves in addition as a grasping arm like the sleeve 30 shown in Figure 12.

Figure 19:
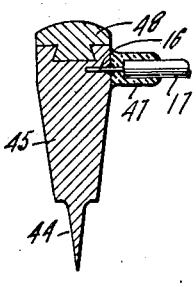
Figure 19 is a sectional view of a still further modified form of connecter.

In constructions where the body portion is composed of a hard metal, such as that shown in Figure 18, it may be found desirable to provide a pounding head composed of soft metal, such as that shown in Figure 19, having the head 48 formed with a constricted neck 49, embedded in the top of the body portion. This construction is otherwise the same as that shown in Figure 18. The head is preferably composed of a soft metal resistant to battery acid fumes such as lead, or coated with a material so resistant.

Figure 20:
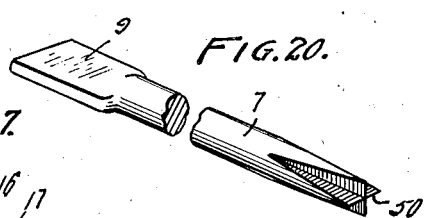
Figure 20 is a perspective view of a pointed member having the end forming a positive marker.
Figure 21:
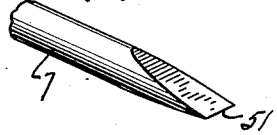
Figure 21 is a perspective view of another pointed member having the end a negative forming marker.

In Figures 20 and 21 are shown pointed members similar to the member 7 shown in Figure 2, provided with flattened tops 9 at the top ends. Instead of points 8, however, the ends are formed to impress a positive sign 50 and a negative sign 51 on the opposite terminals of a battery, as shown in Figures 20 and 21, respectively. These members are adapted to be driven in or otherwise inserted in the corresponding battery terminals to impress positive and negative markings, respectively, therein to permanently imprint the same on the battery terminals. It will be appreciated that this is particularly desirable where positive and negative terminals of the battery cannot otherwise be readily ascertained.

In Figure 22 two connecters, joined by a conductor 17, are shown. Any of the connecters shown may thus be utilized for jumper connections.

There is accomplished by this invention a connecter for the terminals of a storage battery susceptible of wide variation in construction, and yet retaining desirable features recognized as advantageous in such devices.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A connecter for a storage battery terminal comprising a pointed member for fitting in a terminal coated with material resistant to battery acid fumes, formed with a cubical head fixed in a body portion composed of a metal resistant to battery acid fumes, the body portion being downwardly tapered and formed with a pounding head, and a grasping sleeve for receiving an insulated conductor seated in the side of the body portion, and an intermediate member having a bore for receiving the end of the conductor adapted to be fixed therein, fixed to the sleeve and screwed into the cubical head on the pointed member for connecting the conductor thereto.

2. A connecter for a storage battery terminal comprising a pointed member for fitting into a terminal, a cubical head on the pointed member, a body portion of metal resistant to acid fumes surrounding the head, said body portion being formed with a pounding head, a grasping sleeve for receiving an insulated conductor seated in the side of the body portion, and an intermediate member having a bore receiving the end of a conductor fixed therein fastened in the sleeve and screwed into the cubical head to connect the conductor thereto.

3. A connecter for a storage battery terminal comprising a pointed member adapted to be driven into a terminal, a cubical head on the pointed member, a conductor, a body portion of metal resistant to the acid fumes surrounding the cubical head and pointed member and having a frusto-conical seat therein, a grasping sleeve for receiving the conductor provided with a frusto-conical section adapted to rest in the frusto-conical seat in the body portion and screw threaded means adapted to hold the grasping sleeve firmly in the seat.

BENJAMIN F. W. HEYER.